United States Patent [19]

Yin et al.

[11] Patent Number: 5,401,346
[45] Date of Patent: Mar. 28, 1995

[54] LAMINATED HOLOGRAM DECALS FOR IDENTIFICATION CARDS AND THE LIKE

[75] Inventors: Khin S. Yin, Alhambra; John E. Wreede, Azusa; Kevin H. Yu, Temple City, all of Calif.

[73] Assignee: Hughes Aircraft Company, Los Angeles, Calif.

[21] Appl. No.: 205,976

[22] Filed: Mar. 3, 1994

Related U.S. Application Data

[62] Division of Ser. No. 996,235, Dec. 23, 1992, Pat. No. 5,318,816.

[51] Int. Cl.$^6$ ............................ G03H 1/04; B32B 7/12
[52] U.S. Cl. ..................... 156/233; 156/235; 156/239; 156/240; 156/247; 156/249; 430/2; 283/86; 283/109
[58] Field of Search ............... 156/230, 233, 234, 335, 156/239, 247, 240, 241, 242, 249, 248; 428/40; 430/1, 2; 283/107, 86, 108, 109

[56] References Cited

U.S. PATENT DOCUMENTS

| | | | |
|---|---|---|---|
| 4,152,476 | 5/1979 | Stillman | 156/249 X |
| 4,330,352 | 5/1982 | Grimes | 156/239 X |
| 4,376,006 | 3/1983 | Nishikawa | 156/233 X |
| 4,398,985 | 8/1983 | Eagon | 156/247 X |
| 4,568,403 | 2/1985 | Eagan | 156/247 X |
| 4,624,875 | 11/1986 | Watanabe | 156/249 X |
| 4,728,377 | 3/1988 | Gallagher | 156/233 X |
| 4,863,772 | 9/1989 | Cross | 428/40 X |
| 4,893,887 | 1/1990 | Coates | 350/3.6 X |
| 4,908,285 | 3/1990 | Kushibiki | 156/233 X |
| 4,923,848 | 5/1990 | Akada | 503/227 X |
| 4,971,646 | 11/1990 | Schell | 156/244.17 X |
| 5,033,774 | 6/1991 | Bernadelli | 283/108 X |
| 5,104,471 | 4/1992 | Antes | 156/233 |
| 5,310,222 | 5/1994 | Chatwin | 283/86 X |
| 5,319,475 | 6/1994 | Kay | 359/2 X |

*Primary Examiner*—David A. Simmons
*Assistant Examiner*—Charles Rainwater
*Attorney, Agent, or Firm*—L. A. Alkov; W. K. Denson-Low

[57] ABSTRACT

A hologram decal including a hologram layer having first and second surfaces, a first polymer layer secured to the first hologram surface, a second polymer layer secured to the second hologram surface, a pressure sensitive adhesive layer disposed on the non-hologram side of one of the first and second polymer layers, and a release liner covering said pressure sensitive adhesive layer, and techniques for making the hologram decal.

8 Claims, 3 Drawing Sheets

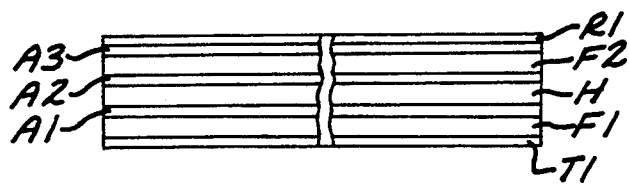
FIG. 1
FIG. 2
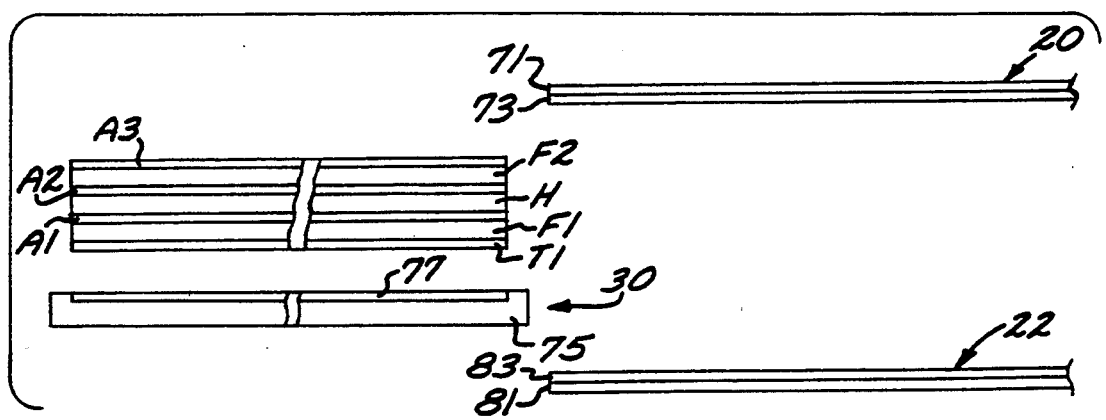
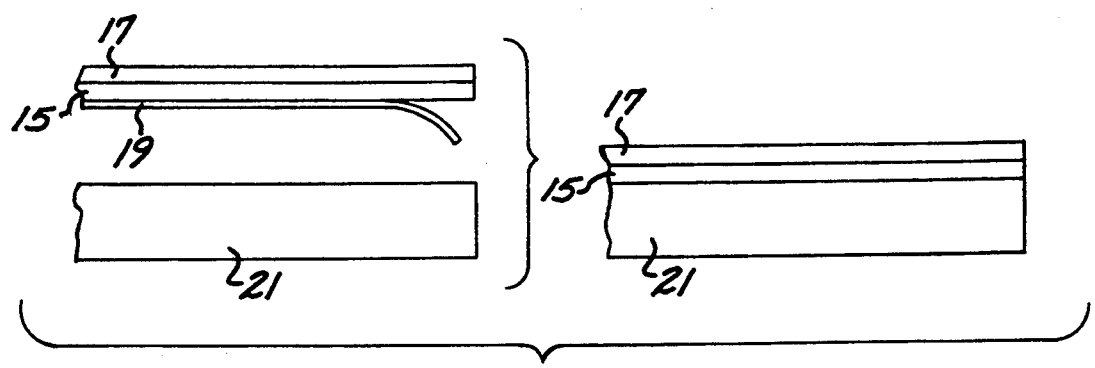
FIG. 3A

LAMINATED HOLOGRAM DECALS FOR IDENTIFICATION CARDS AND THE LIKE

This is a division of application Ser. No. 07/996,235, filed Dec. 23, 1992, now U.S. Pat. No. 5,318,816, issued Jun. 7, 1994.

BACKGROUND OF THE INVENTION

The subject invention is directed generally to hologram structures, and more particularly to laminated decals that can be incorporated into a laminated identification card or the like.

Laminated identification cards such as those containing a photograph of the authorized card holder are widely used for security purposes. Laminated identification cards commonly include other human readable information as well as machine readable information contained on a magnetic strip for example.

An important consideration with laminated identification cards is counterfeiting and/or tampering. One approach to preventing counterfeiting and/or tampering is to incorporate human or machine readable holograms that are difficult into laminated identification cards so that tampering would result in damage to the hologram which would be rendered unreadable. Counterfeiting is prevented by utilizing a hologram whose construction is difficult to ascertain. However, holograms are fragile, and must remain viewable after being subject to identification card manufacturing processes, as well as normal wear and tear, and slight flexing. Some known techniques for incorporating holograms into identification cards do not provide sufficiently high yields in production. Other known techniques for incorporating holograms into identification cards reduce the destruction of the holograms but result in an identification card wherein the hologram can be removed without destroying the hologram, which defeats the purpose of providing indications of tampering.

SUMMARY OF THE INVENTION

It would therefore be an advantage to provide a hologram structure that is readily incorporated into laminated identification cards without being destroyed in the manufacture of the laminated identification cards.

Another advantage would be to provide a hologram structure that is readily incorporated into laminated identification cards and which provides visible indications of tampering while remaining intact and viewable pursuant to normal wear and tear encountered during the lifetime of an identification card in which the hologram structure is incorporated.

The foregoing and other advantages are provided by the invention in a hologram decal that includes a hologram layer having first and second surfaces, a first polymer layer secured to the first hologram surface, a second polymer layer secured to the second hologram surface, a pressure sensitive adhesive layer disposed on the non-hologram side of one of the first and second polymer layers, and a release liner covering said pressure sensitive adhesive layer.

BRIEF DESCRIPTION OF THE DRAWINGS

The advantages and features of the disclosed invention will readily be appreciated by persons skilled in the art from the following detailed description when read in conjunction with the drawing wherein:

FIG. 1 is schematic sectional view illustrating the layers of a hologram decal in accordance with the invention.

FIG. 2 is a schematic sectional view illustrating the incorporation of the hologram decal of FIG. 1 in a laminated identification card.

FIGS. 3A, 3B, and 3C schematically illustrate a process for making the hologram decal of FIG. 1.

DETAILED DESCRIPTION OF THE DISCLOSURE

Figure 3B:
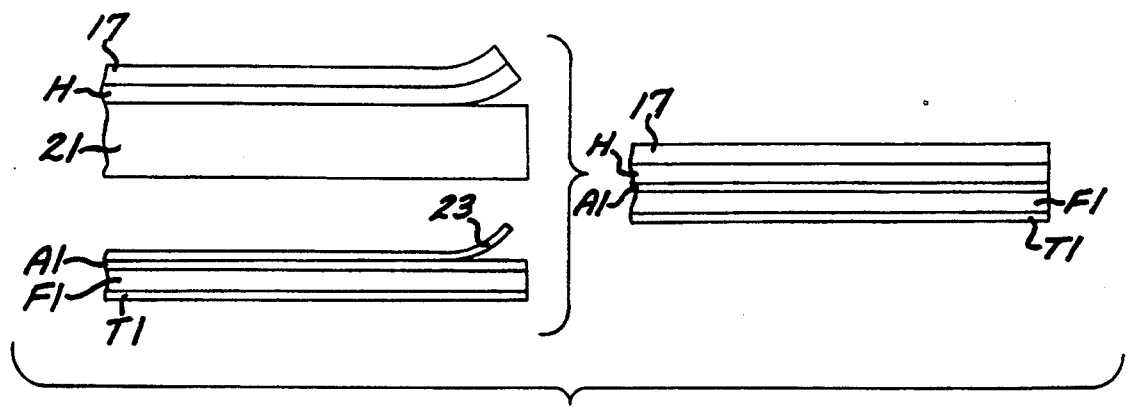

In the following detailed description and in the several figures of the drawing, like elements are identified with like reference numerals.

Referring now to FIG. 1, set forth therein is an unscaled schematic sectional view of a hologram decal laminate in accordance with the invention that is readily incorporated into a laminated identification card by lamination thereof with conventional identification card laminate materials. The hologram decal laminate includes a hologram layer H, comprised of a photopolymer for example, that contains hologram fringes that were recorded to produce the desired holographic image. The hologram layer H is oriented with the viewing side facing upwardly as shown in FIG. 1. The hologram layer H is between an underlying first transparent polyester sheet F1 and an overlying second transparent polyester sheet F2 by first and second transparent pressure sensitive adhesive layers A1, A2 disposed on the lower and top surfaces of the hologram layer H. The pressure sensitive adhesive layers A1 and A2, as well as all other pressure sensitive adhesive layers described herein as being in contact with a hologram layer, comprise an appropriate adhesive that is compatible with the particular material utilized for the hologram layer and does not chemically attack the hologram layer.

A third transparent pressure sensitive adhesive layer A3 is disposed on the top surface of the second polyester sheet F2, while a transparent thermoplastic adhesive layer T1 is disposed on the lower surface of the first polyester film layer F1. A release liner R1 protects the third pressure sensitive adhesive layer A3 until the hologram decal laminate is to be applied to an appropriate smooth surface in the identification card lamination process.

Referring now to FIG. 2, the hologram decal structure of FIG. 1 is attached by the third transparent pressure sensitive adhesive layer A3 onto the inside surface of a front overlaminate 20 that forms the transparent front cover of an identification card pursuant to lamination. In accordance with conventional techniques, the front overlaminate is comprised of a transparent polyester film 71 and a thermoplastic adhesive layer 73. In particular as to the attachment of the hologram decal of FIG. 1, the release liner R1 is removed from the hologram decal, and the decal is roll laminated onto the portion of the thermoplastic adhesive layer 73 that is to be facing the front side of an identification card, with the pressure sensitive adhesive layer A3 facing the thermoplastic adhesive layer 73 of the front overlaminate such that the hologram viewing side is toward the front the front overlaminate 20. The laminate structure comprised of the front overlaminate 20 with the hologram decal attached thereto is then thermolaminated with a core laminate 30 and a back overlaminate 22 which forms the back cover of the laminated identification card.

The core laminate 30 is comprised of an opaque polyester substrate 75 that supports an identifying layer 77 contained in a recess formed in the polyester substrate 15. The identifying layer 77 can contain a photograph as well as other visually recognizable information. The back overlaminate 22 is comprised of a transparent polyester film 81 and a transparent thermoplastic adhesive layer 83, and is laminated with the transparent thermoplastic adhesive layer facing the core laminate 30. In accordance with conventional techniques, the front and back overlaminates 20, 22 can comprise separate sheets or they can comprise a conventional commercially available lamination pouch wherein one side of the pouch forms the front overlaminate and the other side of the pouch forms the back overlaminate. As is well known, a lamination pouch is formed by folding and heat sealing selected edges of a polyester sheet having a thermoplastic adhesive layer disposed thereon.

By way of illustrative examples, the thicknesses of the various layers of the hologram decal laminate can be as follows:

Hologram layer H: about 0.0005 inches.
Pressure sensitive adhesive layers A1, A2, A3: less than 0.001 inches.
Polyester sheets F1, F2: about 0.002 inches.
Release liner R1: about 0.0005 inches.

Figure 3C:
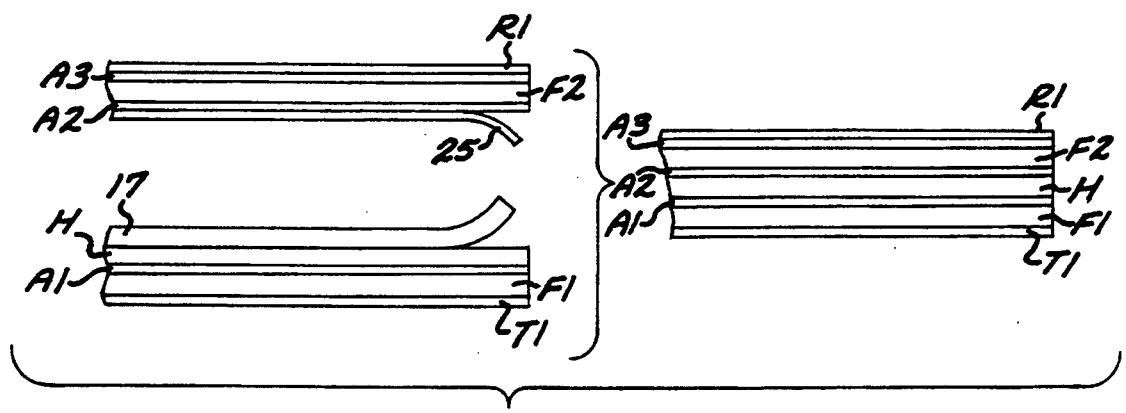

Referring now to FIGS. 3A through 3C, the hologram decal of FIG. 1 can be made as follows. The hologram layer H is formed pursuant to exposure and processing of a hologram recording layer 15 that is disposed between a thick Mylar substrate 17 and a thin Mylar cover sheet 19, as shown in FIG. 3A. The thin cover sheet 19 is removed and the uncovered side of the hologram recording layer 15 is applied to a glass substrate 21 for hologram exposure, as further shown in FIG. 3A.

After exposure and processing, the resulting hologram layer and the Mylar substrate are removed from the glass substrate 21, as shown in FIG. 3B. The first polyester sheet F1 and the first pressure sensitive adhesive layer A1 comprise, for example, a commercially available single sided tape having a pressure sensitive adhesive layer compatible with the hologram layer H on one side of a polyester sheet and a release liner 23 protecting the adhesive, as also shown in FIG. 3B. The thermoplastic adhesive layer T1 is applied to the non-adhesive side of the single sided tape pursuant to conventional techniques, and the release liner 23 is removed from the pressure sensitive adhesive layer A1 so that the laminate comprised of the thermoplastic adhesive layer T1, the first polyester sheet F1, and the first pressure sensitive adhesive layer A1 is applied to the hologram layer H with the pressure sensitive layer A1 against the uncovered side of the hologram layer H, as further shown in FIG. 3B.

Referring now to FIG. 3C, the second polyester sheet F2, the pressure sensitive adhesive layers A2, A3 on either side thereof, and the outside release liner R1 are comprised, for example, of a commercially available double sided tape comprised of a polyester sheet F2 having pressure sensitive adhesive layers A2, A3 on both sides thereof and release liners R1, 25 protecting the pressure sensitive adhesive layers. The release liner 25 is removed from the doubled sided tape, and the Mylar substrate 17 is removed from the hologram containing laminate of FIG. 3B. These two laminates are then roll laminated together with the uncovered second pressure sensitive adhesive layer S2 against uncovered side of the hologram layer H to form the hologram decal of FIG. 1.

Figure 4:
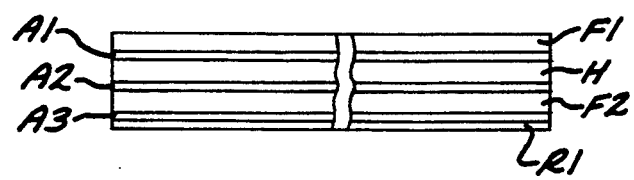
FIG. 4 is schematic sectional view illustrating the layers of a further hologram decal in accordance with the invention.

Referring now to FIG. 4, set forth therein is a further hologram decal laminate in accordance with the invention that is readily incorporated into a laminated identification card by lamination thereof with conventional identification card laminate materials. The hologram decal laminate includes a hologram layer H, comprised of a photopolymer for example, that contains hologram fringes that were recorded to produce the desired holographic image. The hologram layer H is oriented with the viewing side facing upwardly as shown in FIG. 4. The hologram layer H is between an overlying first transparent polyester film layer F1 and an underlying second transparent polyester film layer F2 by first and second transparent adhesive layers A1, A2 disposed on the top and lower surfaces of the hologram layer H. A third transparent pressure sensitive adhesive layer A3 is disposed on the lower surface of the second polyester film F2. A release liner R1 protects the third pressure sensitive adhesive layer A3 until the hologram decal is to be applied to an appropriate smooth surface in the identification card lamination process.

The hologram decal laminate of FIG. 4 is similar to the hologram decal of FIG. 1, except that the thermoplastic adhesive layer T1 is not included, and the remaining laminate layers above and below the hologram layer have been interchanged. In particular, the layers A1 and F1 of the decal structure of FIG. 1 have been inverted and placed on the top surface of the hologram layer H of the decal of FIG. 4; and the layers A2, F2, A3, and R1 of the decal of FIG. 1 have been inverted and placed on the lower surface of the hologram layer H of the decal of FIG. 4. Like the decal of FIG. 1, the decal of FIG. 4 is intended to be laminated in an identification card with the top surface of the hologram facing the front of the identification card. However, the decal of FIG. 4 is intended to be secured to the core laminate prior to the thermal lamination process as discussed below relative to FIG. 5. No thermoplastic adhesive is required on the top of the decal laminate since the front overlaminate that forms the transparent front cover of the identification card includes a thermoplastic adhesive layer.

Figure 5:
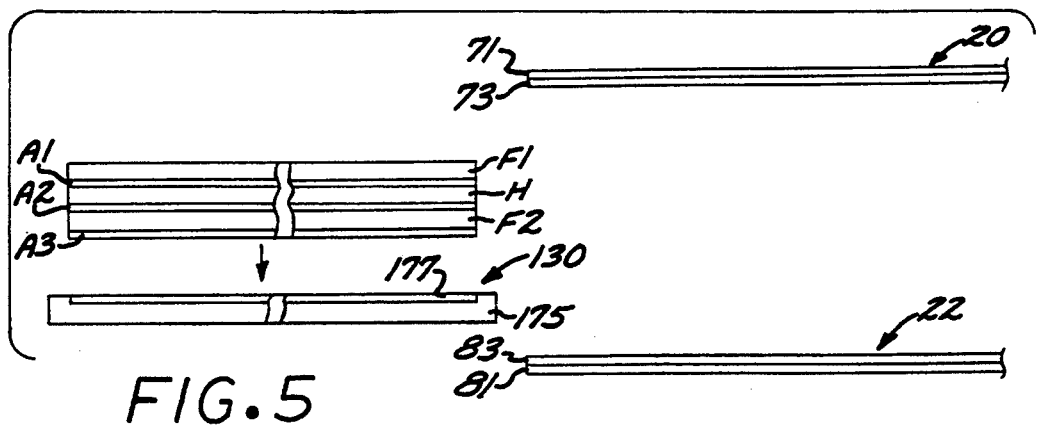
FIG. 5 is a schematic sectional view illustrating the incorporation of the hologram decal of FIG. 4 in a laminated identification card.

Referring now to FIG. 5, the hologram decal structure of FIG. 4 is attached by the third transparent pressure sensitive adhesive layer A3 onto the front side of a core laminate 130 that is similar to the core laminate 30 of FIG. 2 and is comprised of an opaque polyester substrate 175 that supports an identifying layer 177 contained in a recess formed in the polyester substrate 175. The identifying layer 177 can contain a photograph as well as other visually recognizable information. Pursuant to conventional techniques, the structure comprised of the core laminate 130 with the hologram decal attached to the front thereof is thermolaminated with a front overlaminate 20 and a back overlaminate 22 which are substantially similar to the front and back overlaminates 20, 22 of FIG. 2 and described previously.

Figure 6A:
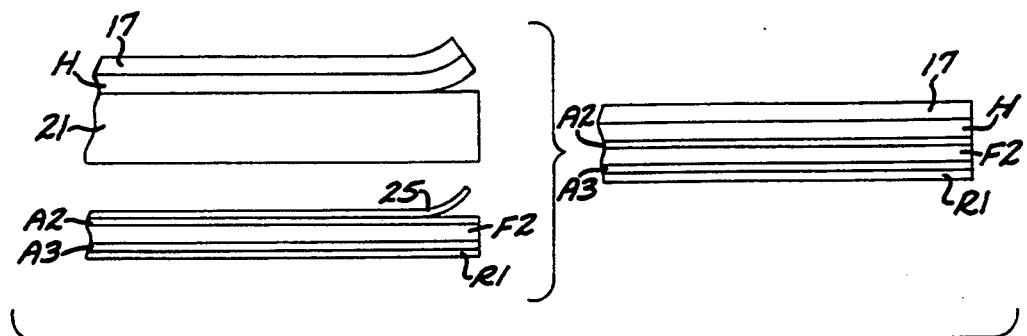
FIGS. 6A and 6B schematically illustrate a process for making the hologram decal of FIG. 4.
Figure 6B:
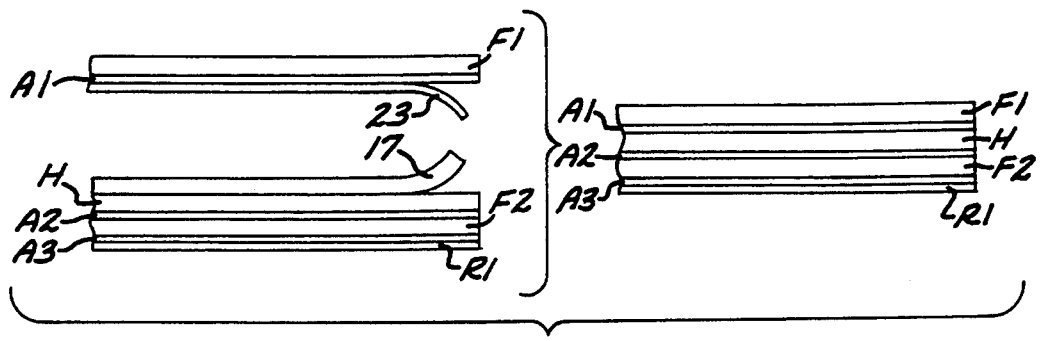

Referring now to FIGS. 6A and 6B, the hologram decal of FIG. 4 can be made as follows. The hologram layer H is formed as described above relative to FIG. 3A. After exposure and processing, the resulting hologram layer H and the Mylar substrate 17 are removed from the glass substrate 21, as shown in FIG. 6A. The second polyester sheet F2, the pressure sensitive adhesive layers A2, A3 on either side thereof, and the outside release liner R1 are comprised, for example, of a commercially available double sided tape comprised of a polyester sheet F2 having pressure sensitive adhesive layers A2, A3 on both sides thereof and release liners R1, 25 protecting the pressure sensitive adhesive layers, as also shown in FIG. 6A. The release liner 25 is removed from the doubled sided tape, and the remaining laminate is then applied to the hologram layer H with the pressure sensitive layer A2 against the uncovered side of the hologram layer H, as further shown in FIG. 6A.

The first polyester sheet F1 and the first pressure sensitive adhesive layer A1 comprise, for example, a commercially available single sided tape having a pressure sensitive adhesive layer A1 on one side of a polyester sheet F1 and a release liner 23 protecting the adhesive, as shown in FIG. 6B. The release liner 23 is removed from the single sided tape, and the Mylar substrate 17 is removed from the hologram containing laminate of FIG. 6A, as also shown in FIG. 6B. These two laminates are then roll laminated together with the uncovered first pressure sensitive adhesive layer A1 against uncovered side of the hologram layer H to form the hologram decal of FIG. 4, as further shown in FIG. 6B.

While two different decal structures have been described in the foregoing relative to two different procedures of initially adhering the decal to the overlaminate of an identification card or to the core substrate of an identification card, it should be appreciated that the decal laminate of FIG. 1 can be utilized for both procedures, wherein the decal laminate is inverted for the procedure wherein the decal is initially adhered to the core substrate. For such procedure wherein the decal laminate is inverted, the hologram would be recorded with the reverse image of the desired playback image, if necessary for proper viewing. Similarly, the decal of FIG. 4 could also be used for both procedures if a thermoplastic adhesive layer is applied to the first polyester sheet F1. If the decal of FIG. 4, as modified to include a thermoplastic adhesive layer, is utilized in the procedure wherein the decal is initially adhered to the core substrate of the identification card, the hologram would be record with the reverse image of the desired playback image, if necessary for proper viewing.

The foregoing has been a disclosure of a hologram decal laminate that is easily installed in the assembly of a laminated identification card using conventional techniques and apparatus, and provides good protection for the hologram prior to installation as well as after installation. The hologram decal can be installed after the photograph and identifying indicia of the card have been prepared, and thus is amenable to installation by the final user. The hologram decal as installed advantageously provides for indication of tampering as it will be destroyed if removed.

Although the foregoing has been a description and illustration of specific embodiments of the invention, various modifications and changes thereto can be made by persons skilled in the art without departing from the scope and spirit of the invention as defined by the following claims.

What is claimed is:

1. A process for making a hologram decal comprising the steps of:
    recording a hologram in a hologram layer having a first surface in contact with a first substrate and a second surface in contact with a second substrate;
    removing the hologram layer and the first substrate from the second substrate such that the second surface of the hologram layer is uncovered;
    attaching to the second surface of the hologram layer a laminar structure comprised of a first polymer layer, a pressure sensitive adhesive layer, and a release liner such that (1) the pressure sensitive layer is between the first polymer layer and the release liner, and (2) the first polymer layer is adjacent the hologram layer;
    removing the first substrate from the hologram layer to uncover the first surface of the hologram layer;
    attaching a second polymer layer to the first surface of the hologram layer.

2. The process of claim 1 wherein:
    the step of attaching a laminar structure to the second surface of the hologram layer includes the step of attaching the laminar structure with layer of pressure sensitive adhesive; and
    the step of attaching a second polymer layer to the first surface of the hologram layer includes the step of attaching the second polymer layer with a layer of pressure sensitive adhesive.

3. A process for making a hologram decal comprising the steps of:
    recording a hologram in a hologram layer having a first side in contact with a first substrate and a second side in contact with a second substrate;
    removing the hologram layer and the first substrate from the second substrate such that the second side of the hologram layer is uncovered;
    attaching a first polymer layer to the second side of the hologram layer;
    removing the first substrate from the hologram layer to uncover the first surface of the hologram layer;
    attaching to the first surface of the hologram layer a laminar structure comprised of a second polymer layer, a pressure sensitive adhesive layer, and a release liner such that (1) the pressure sensitive layer is between the second polymer layer and the release liner, and (2) the second polymer layer is adjacent the hologram layer.

4. The process of claim 3 wherein:
    the step of attaching a first polymer layer to the second surface of the hologram layer includes the step of attaching the first polymer layer with a layer of pressure sensitive adhesive; and
    the step of attaching a laminar structure to the first surface of the hologram layer includes the step of attaching the laminar structure with layer of pressure sensitive adhesive.

5. A process for making a hologram decal comprising the steps of:
    recording a hologram in a hologram layer having a first surface in contact with a first substrate and a second surface in contact with a second substrate;
    removing the hologram layer and the first substrate from the second substrate such that the second surface of the hologram layer is uncovered;
    attaching to the second surface of the hologram layer a laminar structure comprised of a first polymer layer, a pressure sensitive adhesive layer, and a release liner such that (1) the pressure sensitive layer is between the first polymer layer and the release liner, and (2) the first polymer layer is adjacent the hologram layer;

removing the first substrate from the hologram layer to uncover the first surface of the hologram layer;

attaching to first surface of the hologram layer a laminar structure comprised of a second polymer layer and a thermoplastic adhesive layer such that the second polymer layer is adjacent the hologram layer.

6. The process of claim 5 wherein:

the step of attaching a laminar structure to the second surface of the hologram layer includes the step of attaching the laminar structure with layer of pressure sensitive adhesive; and the step of attaching a second polymer layer to the first surface of the hologram layer includes the step of attaching the second polymer layer with a layer of pressure sensitive adhesive.

7. A process for making a hologram decal comprising the steps of:

recording a hologram in a hologram layer having a first side in contact with a first substrate and a second side in contact with a second substrate;

removing the hologram layer and the first substrate from the second substrate such that the second side of the hologram layer is uncovered;

attaching to the second surface of the hologram layer a laminar structure comprised of a first polymer layer and a thermoplastic adhesive layer such that the first polymer layer is adjacent the hologram layer;

removing the first substrate from the hologram layer to uncover the first surface of the hologram layer;

attaching to the first surface of the hologram layer a laminar structure comprised of a second polymer layer, a pressure sensitive adhesive layer, and a release liner such that (1) the pressure sensitive layer is between the second polymer layer and the release liner, and (2) the second polymer layer is adjacent the hologram layer.

8. The process of claim 7 wherein:

the step of attaching a first polymer layer to the second surface of the hologram layer includes the step of attaching the first polymer layer with a layer of pressure sensitive adhesive; and the step of attaching a laminar structure to the first surface of the hologram layer includes the step of attaching the laminar structure with layer of pressure sensitive adhesive.

* * * * *